United States Patent
Li et al.

(10) Patent No.: US 10,592,850 B2
(45) Date of Patent: Mar. 17, 2020

(54) METHOD, COMPUTER PROGRAM PRODUCT, AND SYSTEM FOR PRECISE REAL TIME MARKETING OF A PRODUCT

(71) Applicant: INTERNATIONAL BUSINESS MACHINES CORPORATION, Armonk, NY (US)

(72) Inventors: Jialin Li, Westford, MA (US); Pradeep K. Nanjundaswamy, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 715 days.

(21) Appl. No.: 15/234,154

(22) Filed: Aug. 11, 2016

(65) Prior Publication Data

US 2018/0046982 A1 Feb. 15, 2018

(51) Int. Cl.
| | | |
|---|---|---|
| *G06Q 30/00* | (2012.01) | |
| *G06Q 10/08* | (2012.01) | |
| *G06Q 50/00* | (2012.01) | |
| *G06Q 30/06* | (2012.01) | |
| *G06Q 30/02* | (2012.01) | |

(52) U.S. Cl.
CPC ..... *G06Q 10/0836* (2013.01); *G06Q 30/0261* (2013.01); *G06Q 30/0601* (2013.01); *G06Q 30/0631* (2013.01); *G06Q 30/0639* (2013.01); *G06Q 50/01* (2013.01)

(58) Field of Classification Search
CPC . G06Q 30/0601–0645; G06Q 10/0836; G06Q 30/0261; G06Q 50/01; G06Q 30/0631; G06Q 30/0639
USPC .................... 705/26.1–27.2, 14.58, 319, 339
See application file for complete search history.

(56) References Cited

U.S. PATENT DOCUMENTS

| | | | |
|---|---|---|---|
| 2006/0085259 A1 | 4/2006 | Nicholas et al. | |
| 2011/0178889 A1 | 7/2011 | Abraham et al. | |
| 2012/0173308 A1* | 7/2012 | Brown | G06Q 30/0207 705/14.1 |
| 2013/0006816 A1* | 1/2013 | Nuzzi | G06Q 30/0261 705/27.1 |

(Continued)

OTHER PUBLICATIONS

Duffy, Jill. Get Organized: Using Location-Based Reminders. Jun. 30, 2014 (Jun. 20, 2014). Published by PCMag. (Year: 2014).*

(Continued)

*Primary Examiner* — Jeffrey A. Smith
*Assistant Examiner* — Allison G Wood
(74) *Attorney, Agent, or Firm* — Schmeiser, Olsen & Watts; Isaac J. Gooshaw

(57) ABSTRACT

An approach is provided for marketing a product in real time. A presence of a social contact in a physical store is determined. The contact is connected to a shopper by a social networking service. Based on contextual information about a shopper, it is determined that the shopper intends to purchase the product. A promotion of the product is sent to the shopper. The promotion specifies an online purchase of the product and a selection of a delivery option by which the contact picks up the purchased product at the store. An indication of the online purchase and the selection of the delivery option are received. The contact is notified to pick up the purchased product at the store on behalf of the shopper. A verification that the contact picked up the product is received. The shopper avoids paying a shipping fee and avoids visiting the store.

19 Claims, 5 Drawing Sheets

(56) References Cited

U.S. PATENT DOCUMENTS

| | | |
|---|---|---|
| 2013/0198096 A1 | 8/2013 | Lynch et al. |
| 2013/0275273 A1 | 10/2013 | Champlin et al. |
| 2014/0156452 A1 | 6/2014 | Lupo |
| 2014/0258466 A1* | 9/2014 | Broder .................... H04L 67/02 709/219 |
| 2014/0279269 A1* | 9/2014 | Brantley ............ G06Q 30/0635 705/26.81 |
| 2015/0006308 A1 | 1/2015 | Lin |
| 2015/0006309 A1 | 1/2015 | Philipson |
| 2015/0142591 A1* | 5/2015 | High .................. G06Q 30/0613 705/21 |

OTHER PUBLICATIONS

Online Help; Retrieved from the Internet on Apr. 20, 2016; URL: http://www.toysrus.com/helpdesk/index.jsp?display+product&subdisplay=info; 8 pages.

Shipping & Pickup—Apple; Retrieved from the Internet on Apr. 20, 2016; URL: http://www.apple.com/shop/help/shipping_delivery; 4 pages.

* cited by examiner

METHOD, COMPUTER PROGRAM PRODUCT, AND SYSTEM FOR PRECISE REAL TIME MARKETING OF A PRODUCT

BACKGROUND

The present invention relates to marketing in ecommerce, and more particularly to obtaining and presenting social contact presence data to encourage an online purchase.

Sellers and shoppers engage in activities that are expensive in terms of process, logistics, and time expended. A seller spends time and utilizes resources to market products, provide offers, generate demand, and determine logistics for purchased products. A shopper spends time and utilizes resources to research and compare products and price, add items to an online cart or online wish list, visit physical stores, and complete a purchase transaction via an online cart, a physical store, or other channels. The seller employs marketing techniques to encourage the shopper to make a purchase. The marketing techniques may include offering discounts and other rewards to the shopper, as well as easy and quick order fulfillment options, including instant online ordering and the option for the shopper to pick up the purchased item at a physical store. Before making an online purchase, the shopper considers many factors, including price (i.e., price including shipping costs and tax), post-buy and pre-buy services, inventory availability, etc. An ordering option that allows the shopper to (1) buy an item online and (2) pick up the item in store allows the shopper to avoid or reduce a shipping or service fee and may allow the shopper to receive the item more quickly than had the shopper selected a shipping option. The shopper may decide against an online purchase because the shipping options are too expensive and the option in which the shopper buys online and later picks up the item from a physical store takes a significant amount of time and effort to visit the physical store because the store's location is far away from the shopper's residence or not on the shopper's work commute path.

SUMMARY

In a first embodiment, the present invention provides a method of marketing a product in real time. The method includes a computer determining a presence of a social contact in a physical store associated with a seller of the product. The social contact is a person connected to a shopper by a social networking service. The method further includes, based on contextual information about the shopper, the computer determining that the shopper intends to purchase the product. The method further includes the computer sending a promotion of the product to the shopper. The promotion specifies (i) an online purchase of the product and (ii) a selection of a delivery option for the online purchase, by which the social contact is instructed to pick up the product at the physical store. The method further includes the computer receiving a notification that indicates (i) a completion of the online purchase of the product by the shopper via an ecommerce website associated with the seller and (ii) the selection of the delivery option for the online purchase by which the social contact is instructed to pick up the product at the physical store. The method further includes the computer sending a notification to the social contact to pick up the purchased product from the physical store on behalf of the shopper. The method further includes the computer receiving a verification from the social contact that the social contact picked up the purchased product from the physical store on behalf of the shopper. The aforementioned steps result in a reduction in a payment of a fee for shipping the product to the shopper.

In a second embodiment, the present invention provides a computer program product including a computer-readable storage medium and a computer-readable program code stored in the computer-readable storage medium. The computer-readable program code includes instructions that are executed by a central processing unit (CPU) of a computer system to implement a method of marketing a product in real time. The method includes the computer system determining a presence of a social contact in a physical store associated with a seller of the product. The social contact is a person connected to a shopper by a social networking service. The method further includes, based on contextual information about the shopper, the computer system determining that the shopper intends to purchase the product. The method further includes the computer system sending a promotion of the product to the shopper. The promotion specifies an online purchase of the product and a selection of a delivery option for the online purchase by which the social contact picks up the product at the physical store. The method further includes the computer system receiving an indication of a completion of the online purchase of the product by the shopper via an ecommerce website associated with the seller and receiving the selection of the delivery option for the online purchase by which the social contact picks up the product at the physical store. The method further includes the computer system sending a notification to the social contact to pick up the purchased product from the physical store on behalf of the shopper. The method further includes the computer system receiving a verification from the social contact that the social contact picked up the purchased product from the physical store on behalf of the shopper. The aforementioned steps result in the shopper avoiding a payment of a fee for shipping the product to the shopper and avoiding a visit to the physical store by the shopper to pick up the product.

In a third embodiment, the present invention provides a computer system including a central processing unit (CPU); a memory coupled to the CPU; and a computer-readable storage device coupled to the CPU. The storage device includes instructions that are executed by the CPU via the memory to implement a method of marketing a product in real time. The method includes the computer system determining a presence of a social contact in a physical store associated with a seller of the product. The social contact is a person connected to a shopper by a social networking service. The method further includes, based on contextual information about the shopper, the computer system determining that the shopper intends to purchase the product. The method further includes the computer system sending a promotion of the product to the shopper. The promotion specifies an online purchase of the product and a selection of a delivery option for the online purchase by which the social contact picks up the product at the physical store. The method further includes the computer system receiving an indication of a completion of the online purchase of the product by the shopper via an ecommerce web site associated with the seller and receiving the selection of the delivery option for the online purchase by which the social contact picks up the product at the physical store. The method further includes the computer system sending a notification to the social contact to pick up the purchased product from the physical store on behalf of the shopper. The method further includes the computer system receiving a verification from the social contact that the social contact picked up the purchased product from the physical store on behalf of the shopper. The aforementioned steps result in the shopper avoiding a payment of a fee for shipping the product to the shopper and avoiding a visit to the physical store by the shopper to pick up the product.

Embodiments of the present invention facilitate and increase ecommerce sales by presenting to a shopper an ordering and delivery option for an online purchase of an item by which the shopper orders the item online and a social contact of the shopper picks up the item at a physical store after the shopper purchases the item online. The delivery option is based on the social contact either being in the physical store at the time the delivery option is presented to the shopper or being expected to be in the physical store in the near future. The shopper is motivated to make the online purchase knowing that the social contact is in (or will soon be in) the physical store. The shopper makes the online purchase of the item, avoids or pays reduced service or shipping fees, and avoids the time and effort needed to visit the physical store to pick up the item.

DETAILED DESCRIPTION

Overview

Embodiments of the present invention precisely market in real time a product of a seller by notifying a shopper, who is an online shopper or a potential online shopper, that a social contact of the shopper is currently in a physical store (or will be visiting the physical store in the near future) and that one of the product order and delivery options is purchasing the product online and having the social contact pick up the purchased product at the physical store on behalf of the shopper. The social contact may live near the shopper or may meet the shopper on a regular basis (e.g., at work), thereby making it easy for the social contact to personally hand over the purchased product to the shopper who purchased the product.

Sellers and buyers face unique challenges in completing an online purchase. Sellers need to motivate a shopper to make an instant online purchase even though the shopper may not want to pay shipping costs and may not want to take the time and expend the effort to visit a physical store to pick up a purchased product. Embodiments of the present invention facilitate the online purchase by precisely targeting a shopper with a notification that the shopper can select an ordering and delivery option that avoids shipping costs and avoids the need for the shopper to visit a physical store to pick up the purchased product, where the ordering and delivery option is based on a social contact of the shopper being present in the physical store (or planning to visit the physical store in the near future) and willing to pick up the product after the shopper purchases the product online and while the social contact is in the physical store.

Figure 1:
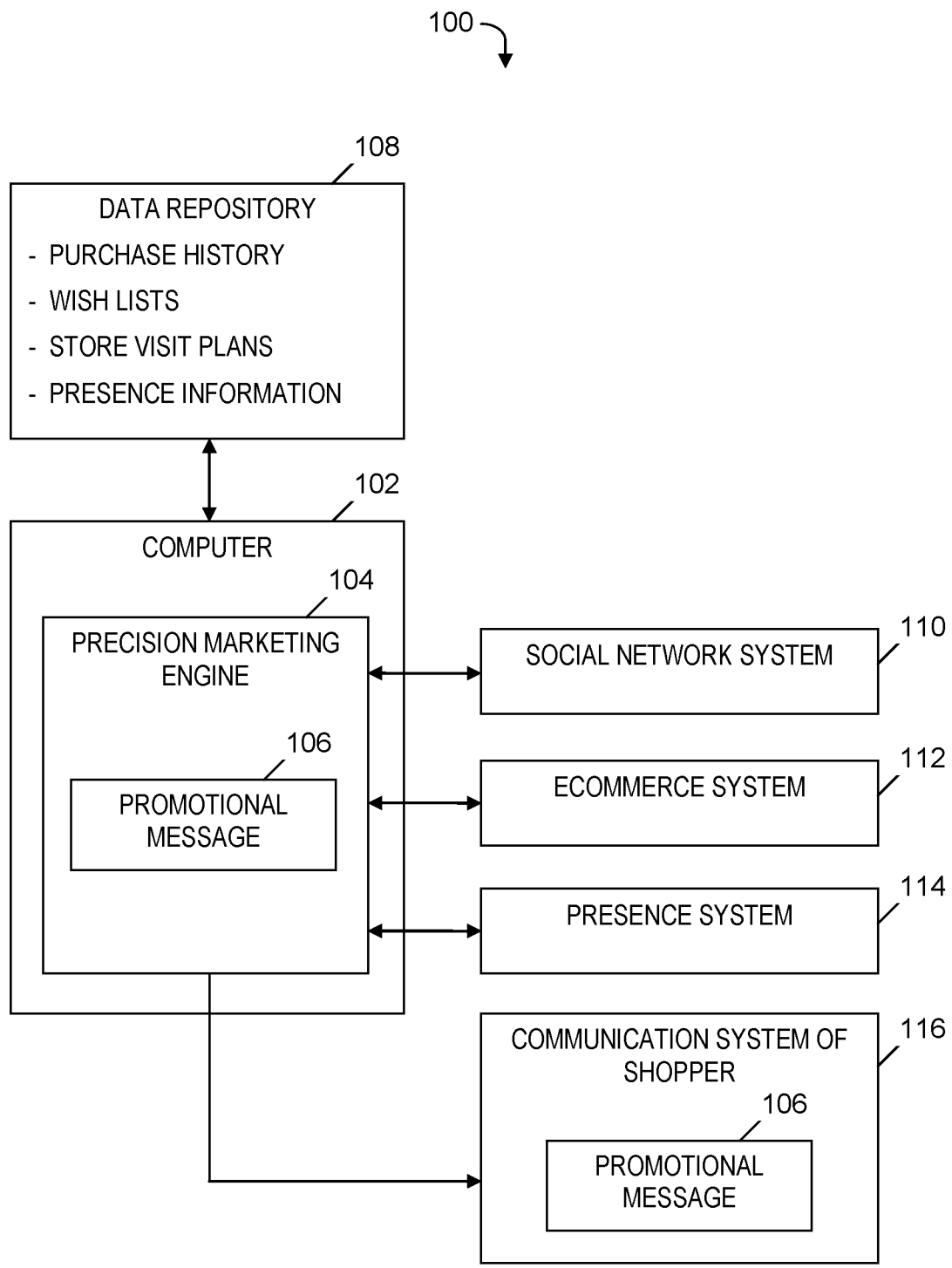
FIG. 1 is a block diagram of a system for precisely marketing a product in real time based on shopper context and social contact availability, in accordance with embodiments of the present invention.

System for Precise Real Time Marketing Based on Shopper Context and Social Contact Availability FIG. 1 is a block diagram of a system 100 for precisely marketing a product in real time based on shopper context and social contact availability, in accordance with embodiments of the present invention. System 100 includes a computer 102, which executes a software-based precision marketing engine 104 which generates a promotional message 106 in real time which precisely markets a product based on a context of a shopper and an availability of a social contact of the shopper to pick up the product in a physical store on behalf of the shopper after the shopper completes an online purchase of the product. Computer 102 is coupled to data repository 108 which stores any combination of: (1) historical data about prior purchases of the shopper, (2) wish lists of the shopper, (3) plans of a social contact of the shopper to visit a physical store at which the product may be picked up on behalf of the shopper after the shopper completes an online purchase of the product, and (4) information about the current geolocation of the social contact and whether the social contact is currently located in the physical store.

Precision marketing engine 104 receives social connection information from a social network system 110, where the social connection information includes a social connection between the shopper and the social contact. Precision marketing engine 104 receives wish lists of the shopper and historical purchases made by the shopper from an ecommerce system 112. In one embodiment, precision marketing engine 104 receives from ecommerce system 112 store visit plans of the social contact to (1) pick up a product at the physical store where the social contact purchased the product online or (2) return a previously purchased product to the physical store.

Precision marketing engine 104 receives current presence information about the social contact from a presence system 114. In embodiments, presence system 114 detects and gathers real-time information about mobile devices, including a mobile device being used by the social contact. In embodiments, presence system 114 uses the detected real-time information about mobile devices to monitor presence and track movement of the mobile devices and the users of the mobile devices in a defined space. In embodiments, current presence information includes status indicators that convey the ability and willingness of a user to communicate.

In one embodiment, presence system 114 gathers presence information from Wi-Fi proximity sensors or Location Service Provider (LSP) systems that collect mobile device location data during a protocol hand-shake (i.e. probe exchange). In one embodiment, the mobile device location data is passed from the Wi-Fi proximity sensors or LSP systems to presence system 114 via a connector interface exposed by connector endpoints of presence system 114.

In another embodiment, presence system 114 gathers presence information from mobile devices which are configured to use a wireless technology standard based on frequency-hopping spread spectrum to exchange data over short distances and to detect low energy beacons in real-time. In one embodiment, based on signal strength, a software development kit (SDK) installed on a mobile device evaluates the distance between the beacon and the device and sends the distance information to presence system 114.

In another embodiment, for beacons that use open standard protocols, a SDK installed on the mobile device listens for signals from these beacons and reports the signals to presence system 114.

Precision marketing engine 104 sends promotional message 106 to a communication system 116 of the shopper so that promotional message 106 is displayed or otherwise presented to the shopper. Promotional message 106 specifies an online purchase of the product and a selection for a delivery option by which the social contact picks up the product at a physical store on behalf of the shopper and after the shopper completes the online purchase. Communication system 116 may be, for example, a web browser displaying web pages that include a reserved e-marketing spot (i.e., eSpot). As other examples, communication system 116 may be an email system or a short message service (SMS) system.

Although not shown in FIG. 1, precision marketing engine 104 generates and sends the following rewards: (1) to the shopper for completing the online order and selecting the delivery option by which the social contact picks up the product at the physical store on behalf of the shopper, (2) to the social contact for permitting the sharing of the social contact's current presence information and/or store visit plans (i.e., plans to visit a store to pick up a purchased item or to return an item that had been purchased), and (3) to the social contact for agreeing to pick up the product at the physical store on behalf of the shopper.

In one embodiment, precision marketing engine 104 generates and sends a request (not shown) to the social contact for a verification that the social contact agrees to pick up the product at the physical store on behalf of the shopper. Precision marketing engine 104 generates and sends a notification (not shown) to the social contact to pick up the product at the physical store on behalf of the shopper. In one embodiment, precision marketing engine 104 receives a verification (not shown) from the social contact that the social contact picked up the product at the physical store on behalf of the shopper.

Although not shown in FIG. 1, a computing device (e.g., mobile device) being used by a shopper and another computing device (e.g., mobile device) being used by a social contact of the shopper are coupled to social network system 110, ecommerce system 112, and presence system 114. In one embodiment, the computing devices of the shopper and the social contact are coupled to precision marketing engine 104.

Figure 2A:
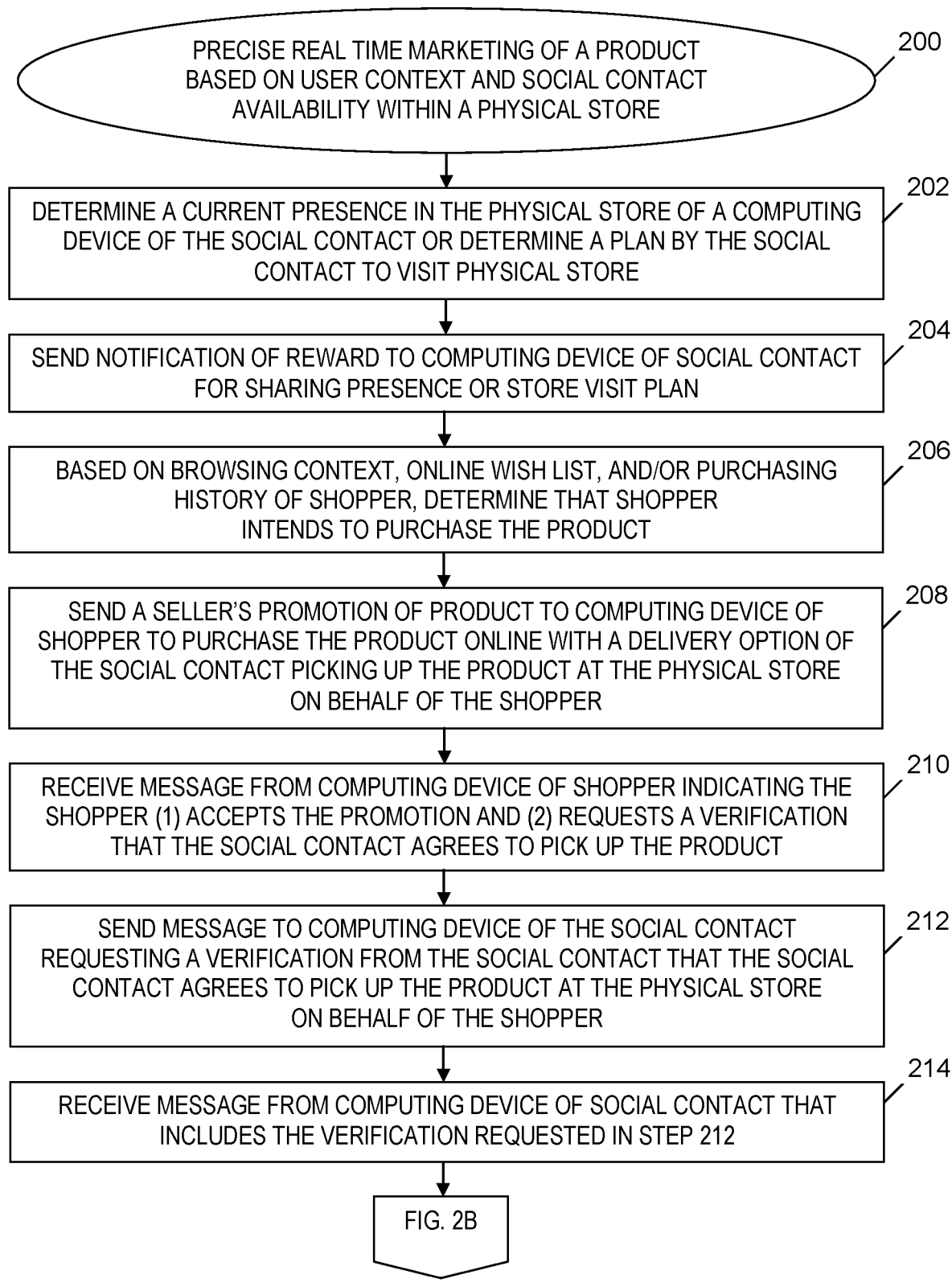
FIGS. 2A-2B depict a flowchart of a process for precisely marketing a product in real time based on shopper context and social contact availability, where the process is implemented in the system of FIG. 1, in accordance with embodiments of the present invention.
Figure 2B:
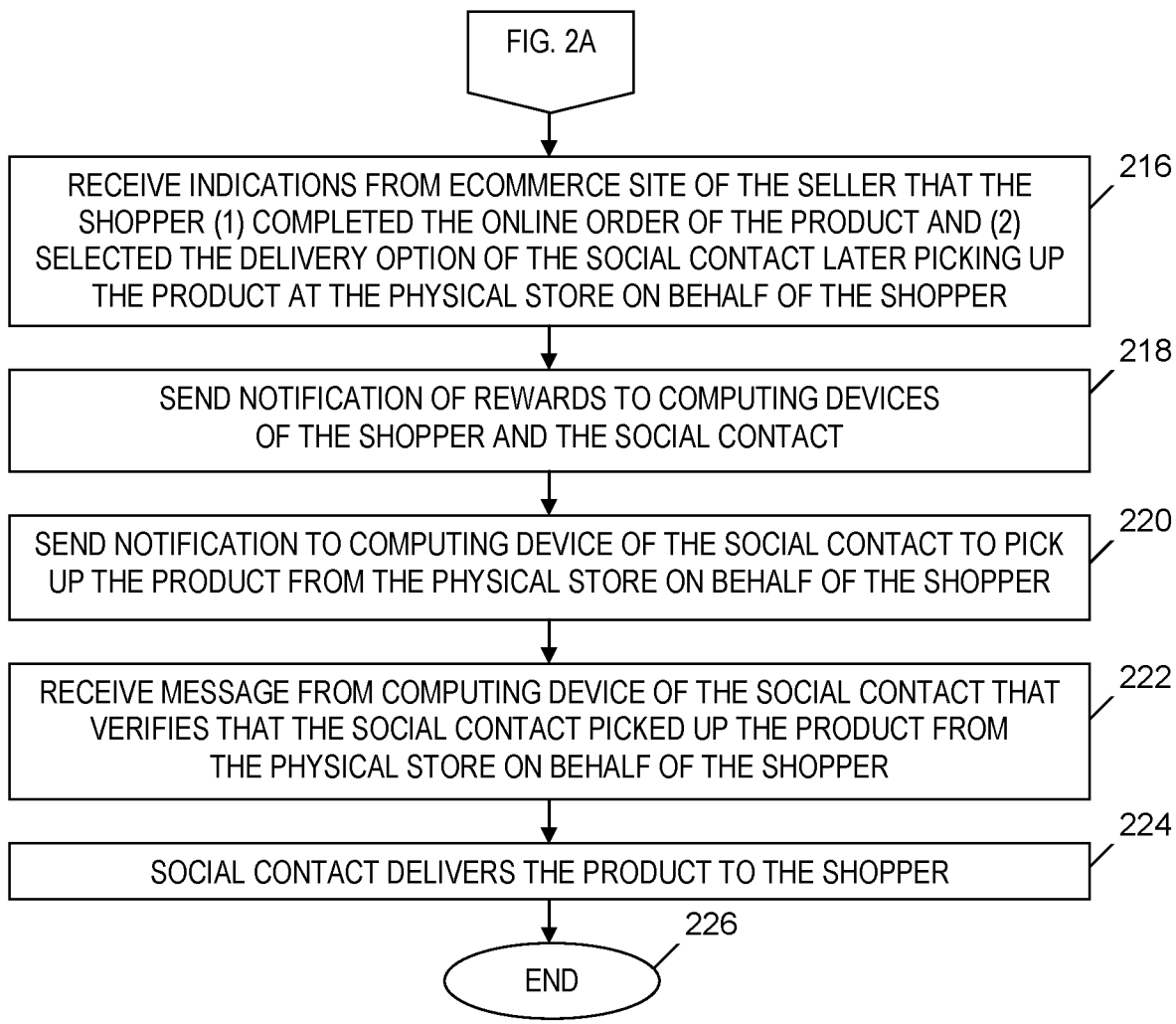
Figure 3:
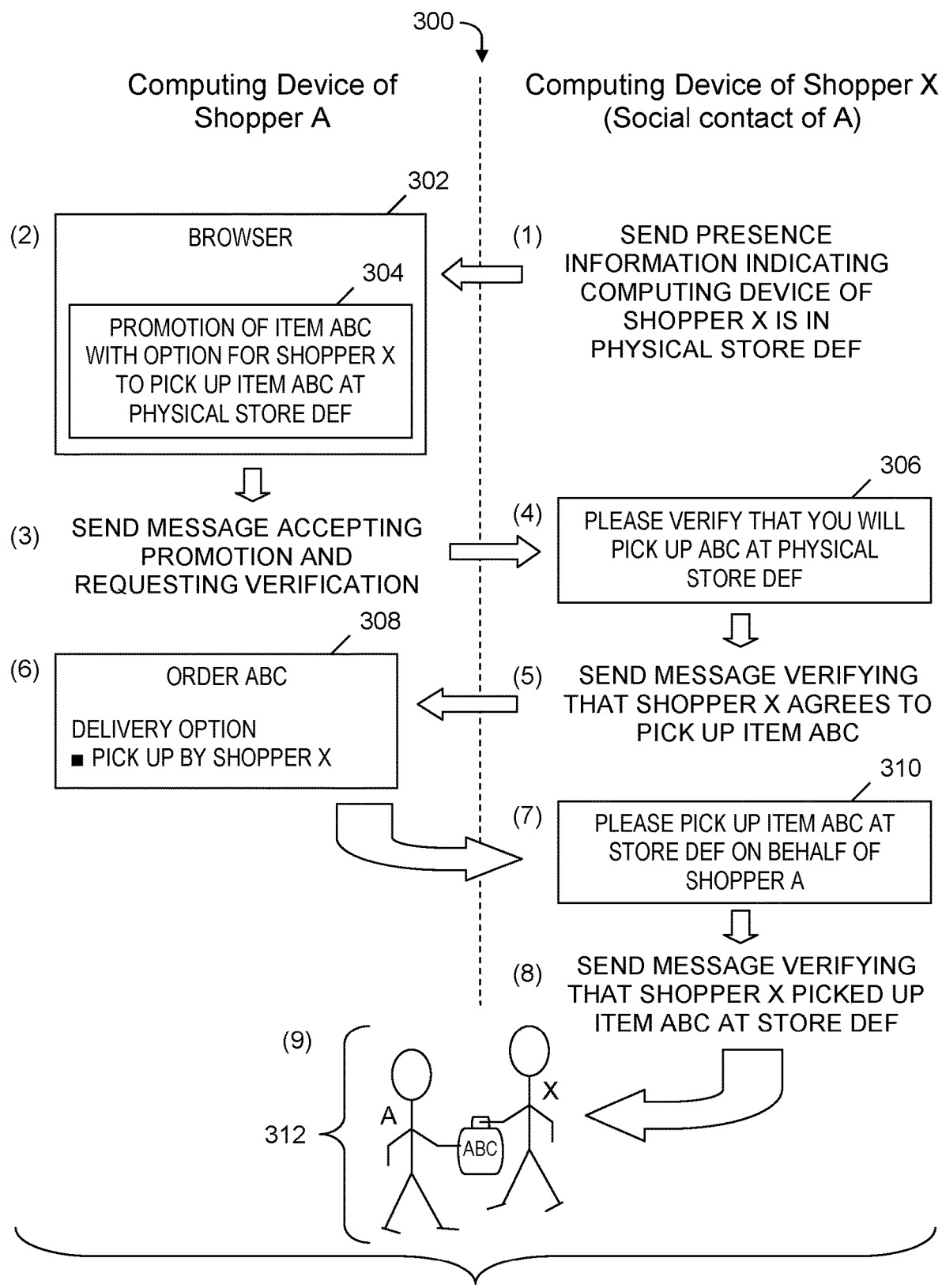
FIG. 3 depicts an example of computing devices of shoppers being used in the process of FIGS. 2A-2B, in accordance with embodiments of the present invention.

The functionality of the components shown in FIG. 1 is described in more detail in the discussion of FIGS. 2A-2B and FIG. 3 presented below.

Process for Precise Real Time Marketing Based on Shopper Context and Social Contact Availability FIGS. 2A-2B depict a flowchart of a process for precisely marketing a product in real time based on shopper context and social contact availability, where the process is implemented in the system of FIG. 1, in accordance with embodiments of the present invention. The process of FIGS. 2A-2B starts at step 200 in FIG. 2A. In step 202, precision marketing engine 104 (see FIG. 1) determines a current presence of a mobile or other computing device used by a social contact who is in a physical store or determines that the social contact has a plan (i.e., store visit plan) to visit the physical store to pick up or return one or more items that had been purchased. The social contact is a person connected to a shopper (i.e., another person) based on profiles managed by a social networking service. In one embodiment, precision marketing engine 104 determines the current presence of a mobile device used by the social contact from presence information about the mobile device sent to precision marketing engine 104 (see FIG. 1) from presence system 114 (see FIG. 1). In one embodiment, precision marketing engine 104 determines a plan by the social contact to visit the physical store based on data received from ecommerce system 112 (see FIG. 1) which indicates that the social contact is picking up a purchased item in the physical store or is returning a previously purchased item to the physical store.

In step 204, precision marketing engine 104 (see FIG. 1) sends an Internet coupon or code or other digital reward (e.g., a discount code that can be used on a future online purchase) to a mobile device or other computing device used by the social contact as a reward for sharing the social contact's current presence and/or store visit plans with precision marketing engine 104 (see FIG. 1).

Prior to step 206, precision marketing engine 104 (see FIG. 1) determines context information about the shopper. The context information includes any combination of: (1) browsing context information about a web browsing session of the shopper (e.g., the products the shopper is viewing in an online catalog of products being offered for sale); (2) online wish lists managed by the shopper; and (3) historical data about purchases made by the shopper. In step 206, based on the context information, precision marketing engine 104 (see FIG. 1) determines that the shopper intends to purchase the product.

In step 208, precision marketing engine 104 (see FIG. 1) sends a seller's promotional message 106 (see FIG. 1) about the product to a mobile device or another computing device of the shopper, where promotional message 106 (see FIG. 1) specifies an online purchase of the product and a selection of a delivery option for the online purchase. By selecting the delivery option specified in promotional message 106 (see FIG. 1), the social contact picks up the purchased product in a physical store and later personally hand delivers (or otherwise delivers) the product to the shopper, so that the shopper pays a reduced fee or is not required to pay a shipping fee for the product and is not required to visit the physical store or make arrangements for someone else to pick up the product in the physical store.

In step 210, precision marketing engine 104 (see FIG. 1) receives a message from the mobile device or other computing device of the shopper that indicates that the shopper accepts the online purchase of the product as promoted in the promotional message 106 (see FIG. 1) and requests a verification from the social contact that the social contact is agreeing to pick up the purchased product at the physical store on behalf of the shopper.

In step 212, precision marketing engine 104 (see FIG. 1) sends a message to the mobile device or other computing device of the social contact that includes the request for the verification from the social contact that the social contact agrees to pick up the purchased product at the physical store on behalf of the shopper.

In step 214, precision marketing engine 104 (see FIG. 1) receives a message from the mobile device or other computing device of the social contact that includes the verification requested in the message sent in step 212.

The process of FIGS. 2A-2B continues in FIG. 2B. In step 216, precision marketing engine 104 (see FIG. 1) receives indications from an ecommerce website of the seller that the shopper completed an online order of the product and that the shopper selected the delivery option by which the social contact later picks up the product at the physical store on behalf of shopper.

In step 218, precision marketing engine 104 (see FIG. 1) sends a reward having monetary value (e.g., an Internet coupon or code) to the mobile device or other computing device of the shopper for completing the online purchase and selecting the aforementioned delivery option and another reward to the mobile device or other computing device of the social contact for agreeing to pick up the purchased product at the physical store on behalf of the shopper. The seller may want the shopper to be aware of the reward sent in step 218 as motivation for the shopper to complete the order using an unfamiliar delivery option and as motivation for the shopper to respond positively to similar promotions received in the future. The reward to the social contact may be based on the amount of shipping cost that the shopper saves. In some embodiments, precision marketing engine 104 (see FIG. 1) sends a message to one or both of the computing devices of the shopper and social contact that notifies them of the reward. Alternatively, the sending of one or more both of the rewards in step 218 may be omitted from the process of FIGS. 2A-2B.

In step 220, precision marketing engine 104 (see FIG. 1) sends a notification to the mobile device or other computing device of the social contact to pick up the product from the physical store on behalf of the shopper.

In step 222, precision marketing engine 104 (see FIG. 1) receives a message from the mobile device or other computing device of the social contact that verifies that the social contact successfully picked up the product from the physical store on behalf of the shopper.

In step 224, the social contact delivers the product to the shopper with no charge for delivery. For example, the social contact may live near the shopper or see the shopper at work every weekday and may use this proximity to the shopper to personally hand deliver the product to the shopper. The process described above allows the shopper to complete an online purchase of the product and obtain the product without being charged a shipping fee or other delivery fee, and without needing to visit the physical store or making arrangements with another person to pick up the product at the physical store. In one embodiment, ecommerce system 112 (see FIG. 1) charges the shopper a service fee for offering the delivery option by which the social contact picks up the product, where the service fee is less than a shipping fee that the ecommerce system 112 (see FIG. 1) would charge if the shopper had selected another delivery option by which a shipping service delivers the product to the shopper.

The process of FIGS. 2A-2B ends at step 226 in FIG. 2B.

EXAMPLE

FIG. 3 depicts an example 300 of computing devices of shoppers A and X being used in the process of FIGS. 2A-2B, in accordance with embodiments of the present invention. In step (1) in example 300, a mobile device of Shopper X sends presence information to presence system 114 (see FIG. 1), where the presence information indicates that the computing device of Shopper X is in a physical store (i.e., Store DEF). Step (1) is included in step 202 (see FIG. 2A).

In step (2), a web browser 302 displayed on a computing device of Shopper A includes a promotion 304 of Item ABC for an online sale together with a delivery option for Shopper X, who is a social contact of Shopper A, to pick up Item ABC at Store DEF on behalf of Shopper A. For example, promotion 304 is displayed in an eSpot included in browser 302. Step (2) is a result of sending the promotion of Item ABC to the computing device of Shopper A in step 208 (see FIG. 2A).

In step (3), the computing device of Shopper A sends a message to ecommerce system 112 (see FIG. 1) accepting the promotion of Item ABC and requesting a verification from Shopper X that Shopper X will pick up Item ABC at Store DEF on behalf of Shopper A after Shopper A completes an online purchase of Item ABC. Step (3) is included in step 212 (see FIG. 2A).

In step (4), the computing device of Shopper X receives a message from precision marketing engine 104 (see FIG. 1) 306 requesting that Shopper X verify that Shopper X will pick up Item ABC from Store DEF on behalf of Shopper A. Step (4) is a result of sending the message requesting the verification in step 212 (see FIG. 2A).

In step (5), the computing device of Shopper X sends a message to precision marketing engine 104 (see FIG. 1) verifying that Shopper X agrees to pick up Item ABC from Store DEF on behalf of Shopper A. Step (5) results in receiving the message in step 214 (see FIG. 2A).

In step (6), the computing device of Shopper A sends to an ecommerce website of the seller via ecommerce system 112 (see FIG. 1) a completed online order 308 for Item ABC using browser 302, where the online order includes a selection of the delivery option "Pick up by Shopper X." Step (6) results in receiving the indications from the ecommerce website of the seller that Shopper A (i) completed the online order of Item ABC and (ii) selected the delivery option of Shopper X picking up Item ABC at Store DEF on behalf of Shopper A in step 216 (see FIG. 2B).

In step (7), the computing device of Shopper X receives from precision marketing engine 104 (see FIG. 1) a notification 310 to pick up Item ABC at Store DEF on behalf of Shopper A. Step (7) is a result of sending the notification in step 220 (see FIG. 2B).

In step (8), the computing device of Shopper X sends a message to precision marketing engine 104 (see FIG. 1) verifying that Shopper X picked up Item ABC in Store DEF on behalf of Shopper A. Step (8) results in receiving the message in step 222 (see FIG. 2B).

In step (9), while Shopper X is in the same physical location as Shopper A, Shopper X delivers Item ABC to Shopper A by hand, thereby allowing Shopper A to avoid a visit to Store DEF to purchase Item ABC and avoid shipping costs that are associated with other online order delivery options. Step (9) is included in step 224 (see FIG. 2B).

Computer System

Figure 4:
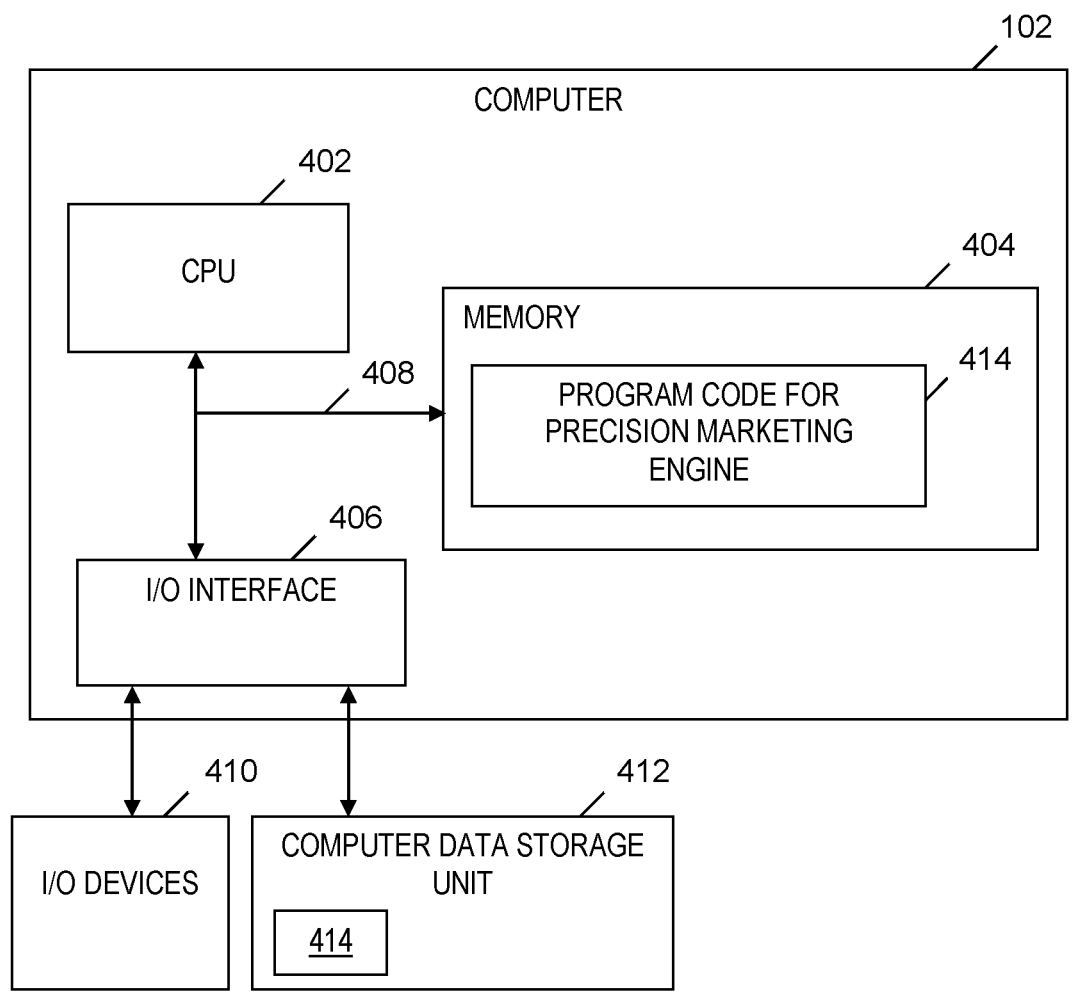
FIG. 4 is a block diagram of a computer that is included in the system of FIG. 1 and that implements the process of FIGS. 2A-2B, in accordance with embodiments of the present invention.

FIG. 4 is a block diagram of computer 102 that is included in the system of FIG. 1 and that implements the process of FIGS. 2A-2B, in accordance with embodiments of the present invention. Computer 102 is a computer system that generally includes a central processing unit (CPU) 402, a memory 404, an input/output (I/O) interface 406, and a bus 408. Computer 102 is coupled to I/O devices 410 and a computer data storage unit 412. CPU 402 performs computation and control functions of computer 102, including executing instructions included in program code 414 for precision marketing engine 104 (see FIG. 1) to perform a method of precisely marketing a product in real time based on shopper context and social contact availability, where the instructions are executed by CPU 402 via memory 404. CPU 402 may include a single processing unit, or be distributed across one or more processing units in one or more locations (e.g., on a client and server).

Memory 404 includes a known computer readable storage medium, which is described below. In one embodiment, cache memory elements of memory 404 provide temporary storage of at least some program code (e.g., program code 414) in order to reduce the number of times code must be retrieved from bulk storage while instructions of the program code are executed. Moreover, similar to CPU 402, memory 404 may reside at a single physical location, including one or more types of data storage, or be distributed across a plurality of physical systems in various forms. Further, memory 404 can include data distributed across, for example, a local area network (LAN) or a wide area network (WAN).

I/O interface 406 includes any system for exchanging information to or from an external source. I/O devices 410 include any known type of external device, including a display device, keyboard, etc. Bus 408 provides a communication link between each of the components in computer 102, and may include any type of transmission link, including electrical, optical, wireless, etc.

I/O interface 406 also allows computer 102 to store information (e.g., data or program instructions such as program code 414) on and retrieve the information from computer data storage unit 412 or another computer data storage unit (not shown). Computer data storage unit 412 includes a known computer-readable storage medium, which is described below. In one embodiment, computer data storage unit 412 is a non-volatile data storage device, such as a magnetic disk drive (i.e., hard disk drive) or an optical disc drive (e.g., a CD-ROM drive which receives a CD-ROM disk).

Memory 404 and/or storage unit 412 may store computer program code 414 that includes instructions that are executed by CPU 402 via memory 404 to precisely market a product in real time based on shopper context and social contact availability. Although FIG. 4 depicts memory 404 as including program code 414, the present invention contemplates embodiments in which memory 404 does not include all of code 414 simultaneously, but instead at one time includes only a portion of code 414.

Further, memory 404 may include an operating system (not shown) and may include other systems not shown in FIG. 4.

Storage unit 412 may include data repository 108 (see FIG. 1) and may store historical data about prior purchases made by a shopper, wish lists of the shopper, store visit plans of the social contact of the shopper, and current presence information about the social contact.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to precisely marketing a product in real time based on shopper context and social contact availability. Thus, an embodiment of the present invention discloses a process for supporting computer infrastructure, where the process includes providing at least one support service for at least one of integrating, hosting, maintaining and deploying computer-readable code (e.g., program code 414) in a computer system (e.g., computer 102) including one or more processors (e.g., CPU 402), wherein the processor(s) carry out instructions contained in the code causing the computer system to precisely market a product in real time based on shopper context and social contact availability. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of precisely marketing a product in real time based on shopper context and social contact availability.

While it is understood that program code 414 for precisely marketing a product in real time based on shopper context and social contact availability may be deployed by manually loading directly in client, server and proxy computers (not shown) via loading a computer-readable storage medium (e.g., computer data storage unit 412), program code 414 may also be automatically or semi-automatically deployed into computer 102 by sending program code 414 to a central server or a group of central servers. Program code 414 is then downloaded into client computers (e.g., computer 102) that will execute program code 414. Alternatively, program code 414 is sent directly to the client computer via e-mail. Program code 414 is then either detached to a directory on the client computer or loaded into a directory on the client computer by a button on the e-mail that executes a program that detaches program code 414 into a directory. Another alternative is to send program code 414 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 414 is transmitted to the proxy server and then it is stored on the proxy server.

Another embodiment of the invention provides a method that performs the process steps on a subscription, advertising and/or fee basis. That is, a service provider, such as a Solution Integrator, can offer to create, maintain, support, etc. a process of precisely marketing a product in real time based on shopper context and social contact availability. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product. The computer program product may include a computer readable storage medium (or media) (memory 404 and computer data storage unit 412) having computer readable program instructions 414 thereon for causing a processor (e.g., CPU 402) to carry out aspects of the present invention.

The computer readable storage medium can be a tangible device that can retain and store instructions (e.g., program code 414) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 414) described herein can be downloaded to respective computing/processing devices (e.g., computer 102) from a computer readable storage medium or to an external computer or external storage device (e.g., computer data storage unit 412) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 414) for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIGS. 2A-2B) and/or block diagrams (e.g., FIG. 1 and FIG. 4) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 414).

These computer readable program instructions may be provided to a processor (e.g., CPU 402) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 412) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 414) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of marketing a product in real time, the method comprising the steps of:

a computer determining a presence of a social contact in a physical store by obtaining, from a presence system, data specifying that a location of a mobile device of the social contact is in the physical store, the obtaining of the data including a Wi-Fi proximity sensor collecting the data during a protocol hand-shake, and the Wi-Fi proximity sensor passing the data to the presence system via a connector interface, the physical store being associated with a seller of the product, and the social contact being a person connected to a shopper by a social networking service;

based on contextual information about the shopper, the computer determining that the shopper intends to purchase the product;

the computer sending a promotion of the product to the shopper, the promotion specifying an online purchase of the product and a selection of a delivery option for the online purchase by which the social contact picks up the product at the physical store;

the computer receiving an indication of a completion of the online purchase of the product by the shopper via an ecommerce website associated with the seller and receiving the selection of the delivery option for the online purchase by which the social contact picks up the product at the physical store;

the computer sending a notification to the social contact to pick up the purchased product from the physical store on behalf of the shopper;

the computer receiving a verification from the social contact that the social contact picked up the purchased product from the physical store on behalf of the shopper, wherein the steps of determining the presence, determining that the shopper intends to purchase the product, sending the promotion, receiving the indication of the completion of the online purchase, receiving the selection of the delivery option, sending the notification to the social contact, and receiving the verification from the social contact provide the completion of the online purchase of the product without a shipping service being selected to deliver the product to the shopper, without a fee for shipping the product being charged to the shopper, and without the shopper being required to (i) visit the physical store to pick up the product or (ii) make arrangements for another person to pick up the product in the physical store;

the computer receiving order information from a second ecommerce system managed by a second seller;

based on the received order information, determining a second social contact is planning to visit a second physical store within a future time period to pick up an item which the second social contact purchased online from the second seller;

based on contextual information about a second shopper who is connected to the second social contact by a second social networking service, the computer determining that the second shopper intends to purchase a second product;

in response to the steps of determining the second social contact is planning to visit the second physical store and determining that the second shopper intends to purchase the second product, the computer sending a second promotion of the second product to the second shopper, the second promotion specifying a second online purchase of the second product and a delivery option for the second online purchase of the second product specifying that the second social contact will pick up the second product at the second physical store on behalf of the second shopper;

the computer receiving an indication of a completion of the second online purchase of the second product by the second shopper via a second ecommerce website associated with the second seller and receiving a selection of the delivery option for the second online purchase of the second product specifying that the second social contact will pick up the second product at the second physical store on behalf of the second shopper;

the computer sending a notification to the second social contact to pick up the purchased second product from the second physical store on behalf of the second shopper; and the computer receiving a verification from the second social contact that the second social contact picked up the purchased second product from the second physical store on behalf of the second shopper, wherein the steps of receiving the order information from the second ecommerce system, determining the second social contact is planning to visit the second physical store, determining that the second shopper intends to purchase the second product, sending the second promotion, receiving the indication of the completion of the second online purchase, receiving the selection of the delivery option for the second online purchase, sending the notification to the second social contact, and receiving the verification from the second social contact provide the completion of the second online purchase of the second product without a shipping service being selected to deliver the second product to the second shopper, without a fee for shipping the second product being charged to the second shopper, and without the second shopper being required to (i) visit the second physical store to pick up the second product or (ii) make arrangements for another person to pick up the second product in the second physical store.

2. The method of claim 1, further comprising the steps of:

subsequent to the step of sending the promotion of the product, the computer receiving an indication that the shopper accepts the promotion and requests a verification from the social contact that the social contact agrees to pick up the product at the physical store on behalf of the shopper;

the computer requesting the verification from the social contact that the social contact agrees to pick up the product at the physical store on behalf of the shopper; and the computer receiving the requested verification that the social contact agrees to pick up the product, wherein the completion of the online order is based in part on the requested verification being received.

3. The method of claim 1, further comprising the steps of:

the computer receiving a permission from the social contact to share social connections to the social contact that are managed by the social networking service and to share a current presence of the social contact in the store, wherein the step of determining the presence is performed in response to the step of receiving the permission and the determined presence is based on the shared current presence of the social contact; and in response to the step of receiving the permission to share the social contacts and to share the current presence in the store, the computer sending a reward to the social contact.

4. The method of claim 1, further comprising the step of in response to the steps of receiving the indication of the completion of the online purchase of the product and receiving the selection of the delivery option by which the social contact picks up the product at the physical store, the computer sending a reward to the shopper and sending a reward to the social contact.

5. The method of claim 1, further comprising the step of the computer determining (1) content that the shopper is browsing in real time via a web browser, (2) an online wish list of the shopper, or (3) historical data about prior purchases made by the shopper, wherein the step of determining that the shopper intends to purchase the product is based on the content the shopper browsing, the online wish list, or the historical data about prior purchases, and wherein the step of determining that the shopper intends to purchase the product is performed without requiring a placement of the product in an online shopping cart.

6. The method of claim 1, wherein the step of sending the promotion of the product to the shopper includes displaying the promotion in a space on a webpage which specifies one or more products being sold by the seller, the space being reserved for displaying marketing information to customers of the seller and the space being viewed by the shopper via a web browser.

7. The method of claim 1, further comprising the step of:
providing at least one support service for at least one of creating, integrating, hosting, maintaining, and deploying computer-readable program code in the computer, the program code being executed by a processor of the computer to implement the steps of determining the presence of the social contact in the physical store, determining that the shopper intends to purchase the product, sending the promotion of the product to the shopper, receiving the indication of the completion of the online purchase of the product, receiving the selection of the delivery option, sending the notification to the social contact to pick up the purchased product from the physical store on behalf of the shopper, receiving the verification, receiving order information from the second ecommerce system, determining the second social contact is planning to visit the second physical store within the future time period, determining that the second shopper intends to purchase the second product, sending the second promotion of the second product to the second shopper, receiving the indication of the completion of the second online purchase of the second product by the second shopper, receiving the selection of the delivery option for the second online purchase of the second product, sending the notification to the second social contact to pick up the purchased second product from the second physical store on behalf of the second shopper, and receiving the verification from the second social contact that the second social contact picked up the purchased second product from the second physical store.

8. A computer program product, comprising:
a computer-readable storage medium; and
a computer-readable program code stored in the computer-readable storage medium, the computer-readable program code containing instructions that are executed by a central processing unit (CPU) of a computer system to implement a method of marketing a product in real time, the method comprising the steps of:
the computer system determining a presence of a social contact in a physical store by obtaining, from a presence system, data specifying that a location of a mobile device of the social contact is in the physical store, the obtaining of the data including a Wi-Fi proximity sensor collecting the data during a protocol hand-shake, and the Wi-Fi proximity sensor passing the data to the presence system via a connector interface, the physical store being associated with a seller of the product, and the social contact being a person connected to a shopper by a social networking service;
based on contextual information about the shopper, the computer system determining that the shopper intends to purchase the product;
the computer system sending a promotion of the product to the shopper, the promotion specifying an online purchase of the product and a selection of a delivery option for the online purchase by which the social contact picks up the product at the physical store;
the computer system receiving an indication of a completion of the online purchase of the product by the shopper via an ecommerce website associated with the seller and receiving the selection of the delivery option for the online purchase by which the social contact picks up the product at the physical store;
the computer system sending a notification to the social contact to pick up the purchased product from the physical store on behalf of the shopper;
the computer system receiving a verification from the social contact that the social contact picked up the purchased product from the physical store on behalf of the shopper, wherein the steps of determining the presence, determining that the shopper intends to purchase the product, sending the promotion, receiving the indication of the completion of the online purchase, receiving the selection of the delivery option, sending the notification to the social contact, and receiving the verification from the social contact provide the completion of the online purchase of the product without a shipping service being selected to deliver the product to the shopper, without a fee for shipping the product being charged to the shopper, and without the shopper being required to (i) visit the physical store to pick up the product or (ii) make arrangements for another person to pick up the product in the physical store;
the computer system receiving order information from a second ecommerce system managed by a second seller;
based on the received order information, determining a second social contact is planning to visit a second physical store within a future time period to pick up an item which the second social contact purchased online from the second seller;
based on contextual information about a second shopper who is connected to the second social contact by a second social networking service, the computer system determining that the second shopper intends to purchase a second product;
in response to the steps of determining the second social contact is planning to visit the second physical store and determining that the second shopper intends to purchase the second product, the computer system sending a second promotion of the second product to the second shopper, the second promotion specifying a second online purchase of the second product and a delivery option for the second online purchase of the second product specifying that the second social contact will pick up the second product at the second physical store on behalf of the second shopper;
the computer system receiving an indication of a completion of the second online purchase of the second product by the second shopper via a second ecommerce website associated with the second seller and receiving a selection of the delivery option for the second online purchase of the second product specifying that the second social contact will pick up the second product at the second physical store on behalf of the second shopper;

the computer system sending a notification to the second social contact to pick up the purchased second product from the second physical store on behalf of the second shopper; and the computer system receiving a verification from the second social contact that the second social contact picked up the purchased second product from the second physical store on behalf of the second shopper, wherein the steps of receiving the order information from the second ecommerce system, determining the second social contact is planning to visit the second physical store, determining that the second shopper intends to purchase the second product, sending the second promotion, receiving the indication of the completion of the second online purchase, receiving the selection of the delivery option for the second online purchase, sending the notification to the second social contact, and receiving the verification from the second social contact provide the completion of the second online purchase of the second product without a shipping service being selected to deliver the second product to the second shopper, without a fee for shipping the second product being charged to the second shopper, and without the second shopper being required to (i) visit the second physical store to pick up the second product or (ii) make arrangements for another person to pick up the second product in the second physical store.

9. The computer program product of claim 8, wherein the method further comprises the steps of:

subsequent to the step of sending the promotion of the product, the computer system receiving an indication that the shopper accepts the promotion and requests a verification from the social contact that the social contact agrees to pick up the product at the physical store on behalf of the shopper;

the computer system requesting the verification from the social contact that the social contact agrees to pick up the product at the physical store on behalf of the shopper; and the computer system receiving the requested verification that the social contact agrees to pick up the product, wherein the completion of the online order is based in part on the requested verification being received.

10. The computer program product of claim 8, wherein the method further comprises the steps of:

the computer system receiving a permission from the social contact to share social connections to the social contact that are managed by the social networking service and to share a current presence of the social contact in the store, wherein the step of determining the presence is performed in response to the step of receiving the permission and the determined presence is based on the shared current presence of the social contact; and in response to the step of receiving the permission to share the social contacts and to share the current presence in the store, the computer system sending a reward to the social contact.

11. The computer program product of claim 8, wherein the method further comprises the step of in response to the steps of receiving the indication of the completion of the online purchase of the product and receiving the selection of the delivery option by which the social contact picks up the product at the physical store, the computer system sending a reward to the shopper and sending a reward to the social contact.

12. The computer program product of claim 8, wherein the method further comprises the step of the computer system determining (1) content that the shopper is browsing in real time via a web browser, (2) an online wish list of the shopper, or (3) historical data about prior purchases made by the shopper, wherein the step of determining that the shopper intends to purchase the product is based on the content the shopper is browsing, the online wish list, or the historical data about prior purchases, and wherein the step of determining that the shopper intends to purchase the product is performed without requiring a placement of the product in an online shopping cart.

13. The computer program product of claim 8, wherein the step of sending the promotion of the product to the shopper includes displaying the promotion in a space on a webpage which specifies one or more products being sold by the seller, the space being reserved for displaying marketing information to customers of the seller and the space being viewed by the shopper via a web browser.

14. A computer system comprising:

a central processing unit (CPU);

a memory coupled to the CPU; and a computer readable storage device coupled to the CPU, the storage device containing instructions that are executed by the CPU via the memory to implement a method of marketing a product in real time, the method comprising the steps of:

the computer system determining a presence of a social contact in a physical store by obtaining, from a presence system, data specifying that a location of a mobile device of the social contact is in the physical store, the obtaining of the data including a Wi-Fi proximity sensor collecting the data during a protocol hand-shake, and the Wi-Fi proximity sensor passing the data to the presence system via a connector interface, the physical store being associated with a seller of the product, and the social contact being a person connected to a shopper by a social networking service;

based on contextual information about the shopper, the computer system determining that the shopper intends to purchase the product;

the computer system sending a promotion of the product to the shopper, the promotion specifying an online purchase of the product and a selection of a delivery option for the online purchase by which the social contact picks up the product at the physical store;

the computer system receiving an indication of a completion of the online purchase of the product by the shopper via an ecommerce website associated with the seller and receiving the selection of the delivery option for the online purchase by which the social contact picks up the product at the physical store;

the computer system sending a notification to the social contact to pick up the purchased product from the physical store on behalf of the shopper;

the computer system receiving a verification from the social contact that the social contact picked up the purchased product from the physical store on behalf of the shopper, wherein the steps of determining the presence, determining that the shopper intends to purchase the product, sending the promotion, receiving the indication of the completion of the online purchase, receiving the selection of the delivery option, sending the notification to the social contact, and receiving the verification from the social contact provide the completion of the online purchase of the product without a shipping service being selected to deliver the product to the shopper, without a fee for shipping the product being charged to the shopper, and without the shopper being required to (i) visit the physical store to pick up the product or (ii) make arrangements for another person to pick up the product in the physical store;

the computer system receiving order information from a second ecommerce system managed by a second seller;

based on the received order information, determining a second social contact is planning to visit a second physical store within a future time period to pick up an item which the second social contact purchased online from the second seller;

based on contextual information about a second shopper who is connected to the second social contact by a second social networking service, the computer system determining that the second shopper intends to purchase a second product;

in response to the steps of determining the second social contact is planning to visit the second physical store and determining that the second shopper intends to purchase the second product, the computer system sending a second promotion of the second product to the second shopper, the second promotion specifying a second online purchase of the second product and a delivery option for the second online purchase of the second product specifying that the second social contact will pick up the second product at the second physical store on behalf of the second shopper;

the computer system receiving an indication of a completion of the second online purchase of the second product by the second shopper via a second ecommerce website associated with the second seller and receiving a selection of the delivery option for the second online purchase of the second product specifying that the second social contact will pick up the second product at the second physical store on behalf of the second shopper;

the computer system sending a notification to the second social contact to pick up the purchased second product from the second physical store on behalf of the second shopper; and the computer system receiving a verification from the second social contact that the second social contact picked up the purchased second product from the second physical store on behalf of the second shopper, wherein the steps of receiving the order information from the second ecommerce system, determining the second social contact is planning to visit the second physical store, determining that the second shopper intends to purchase the second product, sending the second promotion, receiving the indication of the completion of the second online purchase, receiving the selection of the delivery option for the second online purchase, sending the notification to the second social contact, and receiving the verification from the second social contact provide the completion of the second online purchase of the second product without a shipping service being selected to deliver the second product to the second shopper, without a fee for shipping the second product being charged to the second shopper, and without the second shopper being required to (i) visit the second physical store to pick up the second product or (ii) make arrangements for another person to pick up the second product in the second physical store.

15. The computer system of claim 14, wherein the method further comprises the steps of:

subsequent to the step of sending the promotion of the product, the computer system receiving an indication that the shopper accepts the promotion and requests a verification from the social contact that the social contact agrees to pick up the product at the physical store on behalf of the shopper;

the computer system requesting the verification from the social contact that the social contact agrees to pick up the product at the physical store on behalf of the shopper; and the computer system receiving the requested verification that the social contact agrees to pick up the product, wherein the completion of the online order is based in part on the requested verification being received.

16. The computer system of claim 14, wherein the method further comprises the steps of:

the computer system receiving a permission from the social contact to share social connections to the social contact that are managed by the social networking service and to share a current presence of the social contact in the store, wherein the step of determining the presence is performed in response to the step of receiving the permission and the determined presence is based on the shared current presence of the social contact; and in response to the step of receiving the permission to share the social contacts and to share the current presence in the store, the computer system sending a reward to the social contact.

17. The computer system of claim 14, wherein the method further comprises the step of in response to the steps of receiving the indication of the completion of the online purchase of the product and receiving the selection of the delivery option by which the social contact picks up the product at the physical store, the computer system sending a reward to the shopper and sending a reward to the social contact.

18. The computer system of claim 14, wherein the method further comprises the step of the computer system determining (1) content that the shopper is browsing in real time via a web browser, (2) an online wish list of the shopper, or (3) historical data about prior purchases made by the shopper, wherein the step of determining that the shopper intends to purchase the product is based on the content the shopper is browsing, the online wish list, or the historical data about prior purchases, and wherein the step of determining that the shopper intends to purchase the product is performed without requiring a placement of the product in an online shopping cart.

19. The computer system of claim 14, wherein the step of sending the promotion of the product to the shopper includes displaying the promotion in a space on a webpage which specifies one or more products being sold by the seller, the space being reserved for displaying marketing information to customers of the seller and the space being viewed by the shopper via a web browser.

\* \* \* \* \*